(12) United States Patent
Shade

(10) Patent No.: US 10,174,875 B2
(45) Date of Patent: Jan. 8, 2019

(54) BRANCHING DEVICE FOR A PULSATION ATTENUATION NETWORK

(75) Inventor: W. Norm Shade, Cambridge, OH (US)

(73) Assignee: ACI SERVICES, INC., Cambridge, OH (US)

( * ) Notice: Subject to any disclaimer, the term of this patent is extended or adjusted under 35 U.S.C. 154(b) by 1298 days.

(21) Appl. No.: 13/563,919

(22) Filed: Aug. 1, 2012

(65) Prior Publication Data

US 2012/0291896 A1    Nov. 22, 2012

Related U.S. Application Data

(63) Continuation-in-part of application No. 12/239,379, filed on Sep. 26, 2008, now abandoned.

(60) Provisional application No. 60/976,075, filed on Sep. 28, 2007.

(51) Int. Cl.
*F16L 55/04* (2006.01)
*F16L 55/027* (2006.01)

(52) U.S. Cl.
CPC ......... *F16L 55/02763* (2013.01); *F16L 55/04* (2013.01); *Y10T 137/87265* (2015.04)

(58) Field of Classification Search
CPC ..... F16K 39/04; A62C 33/06; B01D 15/3861; B01D 15/3876; B01F 5/0471; F17D 1/20; F16L 55/02763; F16L 55/04
USPC ...................... 137/599.01; 181/206, 227, 228
See application file for complete search history.

(56) References Cited

U.S. PATENT DOCUMENTS

| 1,334,007 | A | * | 3/1920 | White ........................... 277/621 |
| 1,740,805 | A | * | 12/1929 | Brice ............................ 181/251 |
| 3,061,039 | A | | 10/1962 | Peters |
| 3,568,791 | A | * | 3/1971 | Luxton ......................... 181/224 |
| 4,445,829 | A | | 5/1984 | Miller |
| 4,514,151 | A | | 4/1985 | Anders et al. |
| 4,585,400 | A | | 4/1986 | Miller |
| 4,600,076 | A | * | 7/1986 | Yamamoto et al. ......... 181/233 |
| 5,762,479 | A | * | 6/1998 | Baars et al. .................. 417/312 |
| 5,957,664 | A | | 9/1999 | Stolz et al. |
| 6,325,145 | B1 | | 12/2001 | Swanson, Jr. |
| 6,633,646 | B1 | * | 10/2003 | Hwang ........................ 381/71.5 |
| 7,146,965 | B1 | | 12/2006 | Li et al. |
| 7,152,583 | B2 | | 12/2006 | Abe et al. |
| 2003/0133812 | A1 | | 7/2003 | Puff et al. |
| 2005/0022332 | A1 | * | 2/2005 | McMillen ...................... 15/320 |
| 2006/0034709 | A1 | | 2/2006 | Thomas et al. |

(Continued)

*Primary Examiner* — Chee-Chong Lee
(74) *Attorney, Agent, or Firm* — Ronald J. Richter; Hasse & Nesbitt LLC

(57) ABSTRACT

A pulsation attenuation network branching device or transition apparatus for controlling pulsation of a fluid in a piping system includes at least one large flow channel, at least two small flow channels, and at least one divider that transitions the large flow channel into the small flow channels internally. Fluid can flow through the device in either direction. One embodiment of the branching device can include a main inlet and a main outlet, an internal attenuating conduit, a branching outlet, and a branching inlet, a first divider for dividing the fluid flow from the main inlet into the internal attenuating conduit and the branching outlet, and a second divider for joining the fluid flowing from the branching inlet and the internal attenuating conduit into the main outlet. Another embodiment can include a main inlet, three branching outlets, and two dividers for transitioning the main inlet into the three branching outlets.

12 Claims, 6 Drawing Sheets

(56) References Cited

U.S. PATENT DOCUMENTS

2009/0038684 A1 2/2009 Chatfield et al.
2010/0111713 A1 5/2010 Chatfield et al.

* cited by examiner

BRANCHING DEVICE FOR A PULSATION ATTENUATION NETWORK

CROSS REFERENCE TO RELATED APPLICATION

This application claims the benefit of pending U.S. application Ser. No. 12/239,379, filed Sep. 26, 2008, now abandoned which claims the benefit of U.S. Provisional Application No. 60/976,075, filed Sep. 28, 2007.

FIELD OF THE INVENTION

The present invention relates in general to the control of the flow of pressurized fluids through industrial and commercial piping systems that include one or more reciprocating (piston-type) compressor cylinders, and in particular to a branching device for aiding in controlling pressure and flow pulsations of complex pressure waves passing through these systems without causing significant system pressure losses.

BACKGROUND OF THE INVENTION

Reciprocating compressors typically include one or more pistons that "reciprocate" within a closed cylinder. They are commonly used for a wide range of applications that include, but are not limited to, the pressurization and transport of natural gas, air, pure gases, and/or gas mixtures through systems that are used for gas transmission, distribution, injection, storage, processing, refining, oil production, refrigeration, air separation, utility, and other industrial and commercial processes. Reciprocating compressors typically draw a fixed mass of gaseous fluid from a suction pipe and, a fraction of a second later, compress and transfer the intake fluid into a discharge pipe.

Reciprocating compressors can produce complex cyclic pressure waves, commonly referred to as pulsation frequencies, which depend upon the operating speed, the gas thermodynamic properties, pressure and temperature, and the design of the gas compression system. For example, reciprocating compressors will typically produce a one or two times the compressor operating speed pulsation frequency, depending upon their design as a single or a double acting compressor, respectively. In addition, the compressor cylinders and piping systems have individual acoustic resonance frequencies. These pressure waves travel through the often complex network of connected pipes, pressure vessels, separators, coolers and other system elements. They can travel for many miles until they are attenuated or damped by friction or other means that reduce the dynamic variation of the pressure.

Over time, the magnitude of the pulsations may excite system mechanical natural frequencies, overstress system elements and piping, interfere with meter measurements, adversely affect compressor cylinder performance, and affect the thermodynamic performance as well as the reliability and structural integrity of the reciprocating compressor and its piping system. Therefore, effective reduction and control of the pressure and flow pulsations generated by reciprocating compressors is necessary to prevent damaging shaking forces and stresses in system piping and pressure vessels, as well as to prevent detrimental time-variant suction and discharge pressures at the compressor cylinder flanges.

In order to reduce, attenuate and/or control the amplitude of system-damaging pressure pulsations upstream and downstream of a reciprocating compressor, it has previously been customary to use a system of expansion volume bottles, choke tubes, orifices, baffles, chambers, etc. that are installed at specific locations in the system piping. These prior art pulsation attenuation devices can be used singly or in combination to dampen the pressure waves and reduce the resulting forces to acceptable levels. However, these devices typically accomplish pulsation attenuation by adding resistance to the system. This added resistance causes system pressure losses both upstream and downstream of the compressor cylinders. When using prior art pulsation attenuation devices, the resulting pressure drop typically increases as the frequency of the pulsation increases. These pressure losses add to the work that must be done by the compressor to move fluid from the suction pipe to the discharge pipe. Although these pressure losses reduce the overall system efficiency, this has been the accepted state-of-the-art technology for reciprocating compressor systems for more than half a century, and the efficiency, power and energy penalty has been tolerated in order to improve the mechanical reliability and integrity of the system.

Although improvements in system modeling have sometimes showed improved results using traditional pulsation attenuation devices, the problem of high system pressure losses continues to be a persistent issue, especially on high flow, low pressure ratio reciprocating compressors. The problem is more serious as energy costs and environmental regulations mandate improvements in system efficiency. Over the past three decades, it has become common to operate large reciprocating compressors at speeds ranging from 600 to 1,200 rpm, instead of the conventional low-speed (200 to 360 rpm) compressors. High-flow, low ratio reciprocating compressors (generally operating at about 600 to 1,000 rpm, with pressure ratios in the range of about 1.1 to 1.6) can experience large system pressure drops with the addition of current pulsation dampeners. In some cases, system pressure drops have resulted in power losses exceeding 15 to 20%, and have been known to be as high as 30%.

As these larger high-speed reciprocating compressors have been increasingly used, pressure losses caused by the addition of traditional pulsation attenuation systems have become more problematic, due to the higher frequency pulsations that must be damped. Significant pressure losses and increased power consumption have also been encountered on high-speed compressors in some higher ratio applications, especially when a wide range of operating conditions is required.

Therefore, the need for a new technology and method for controlling reciprocating compressor pulsations has been increasingly apparent. Further, a natural gas pipeline or other system that addresses pulsation by attenuating pulses at various positions along the pipeline without significantly affecting efficiency of the system is very desirable. Such technology is also desirable in pipeline systems at metering locations, where pulsations interfere with measurement accuracy and reduce flow measurement instrumentation reliability. Such a new technology, finite amplitude wave simulation, has been successfully applied to 2-stroke and 4-stroke engines to increase specific output and reduce exhaust emissions and noise. Advanced computational technology exists for modeling and designing effective engine tuning systems for high-performance racing, recreational and industrial engine applications. However, all of the aforementioned applications of finite amplitude wave simulation technology have typically been applied (with air or low-pressure mixtures of air and fuel) at pressure levels at or near atmospheric pressure, and at no more than about 3 atmospheres of pressure.

Recently, a new technology that involves cancellation of pulsations, rather than dampening, has been used with high flow, low ratio reciprocating compressor systems. The theory behind pulsation attenuation is premised on the idea that, by properly phasing the cylinders of a reciprocating compressor and/or properly choosing the lengths and diameters of pipes in fluid communication with the compressor, outward bound pulsations can be attenuated, and inward bound pulsations can be used to improve the performance of the compressor.

Published U.S. patent application Nos. 2009/0038684 and 2010/0111713, both of which are incorporated herein by reference in their entirety, disclose this technology, which utilizes finite amplitude wave simulation technology or other simulation means, and includes a network of branches of pipes, called a "tuned delay loop" or "tuned loop," located upstream and downstream of a reciprocating compressor.

The tuned loops typically split the main pipe section into two parts, which are then subsequently joined. Typically the two wave parts travel different distances and are then recombined at a later point. The different distances will time delay or phase shift the two wave parts. This time/phase shift will cancel frequency components that are present in the repeating wave. The difference in length of the two paths can be "tuned" to the frequency of a wave to dramatically reduce the pulsation in the pipe. When the difference in length is tuned to the rotating speed (rpm's) of a reciprocating compressor, the pulsations will be substantially reduced without a significant pressure loss. In addition, the pulsations can be time phased at the cylinder suction and discharge to reduce the amount of pumping work that is required. This is accomplished by reflecting a pressure wave to increase the pressure at the cylinder discharge during the suction event and similarly reflecting a pressure wave to decrease the pressure at the cylinder discharge during the discharge event.

In light of this new pulsation attenuation technology, a need exists for a mechanical element that enables and simplifies the fabrication and reduces the cost of the individual tuned loops. There also exists a need to provide the precise internal transition geometry, structural integrity, safety and pressure containment of any gas, including explosive, hazardous, lethal, or toxic gases, required at the divergence and convergence points of the tuned loops or branches. Therefore, a primary object of the present invention is to provide a branching device for creating a junction within pulsation attenuation technology.

SUMMARY OF THE INVENTION

Accordingly, the present invention relates to a branching device for creating a junction within a pulsation attenuation network that significantly controls the pressure pulsation waves created by reciprocating compressor cylinders without causing significant pressure losses in the system. More specifically, the branching device of the present invention is a tuning section transition device ("TST") intended for use with a pulsation attenuation network. The pulsation attenuation network typically includes one or more sequential stages of tuned delay loops that are split from the main pipe section and then subsequently joined to the main pipe section by the use of the TST's disclosed herein; or alternatively includes the joining of two or more piping branches from individual compressor cylinders in selective phasing by the use of the TSTs disclosed herein; or by combinations of the foregoing.

An aspect of the invention provides a branching device for a tuned loop of a pulsation attenuation network (PAN) to which three or more conduits may be coupled, the branching device comprising: at least one large flow channel; at least two small flow channels; and at least one divider that transitions the large flow channel into the at least two small flow channels internally, wherein the flow channels are in fluid communication with one another.

Another aspect of the invention provides a branching device for a pulsation attenuation network, the branching device comprising: a main inlet; a main outlet; an internal attenuating conduit; a branching outlet; a branching inlet; a first divider adapted to divide the flow of fluid from the main inlet into the internal attenuating conduit and the branching outlet; and a second divider adapted to join the flow of fluid from the branching inlet and the internal attenuating conduit into the main outlet.

Another aspect of the device provides a branching device for a pulsation attenuation network, the branching device comprising: a main inlet; a first branching outlet; a second branching outlet; a third branching outlet; and two dividers for transitioning the main inlet into the three branching outlets.

The nature and advantages of the present invention will be more fully appreciated from the following drawings, detailed description and claims.

BRIEF DESCRIPTION OF THE DRAWINGS

The accompanying drawings illustrate embodiments of the invention and, together with a general description of the invention given above, and the detailed description given below, serve to explain the principles of the invention.

DETAILED DESCRIPTION OF THE INVENTION

Figure 1:
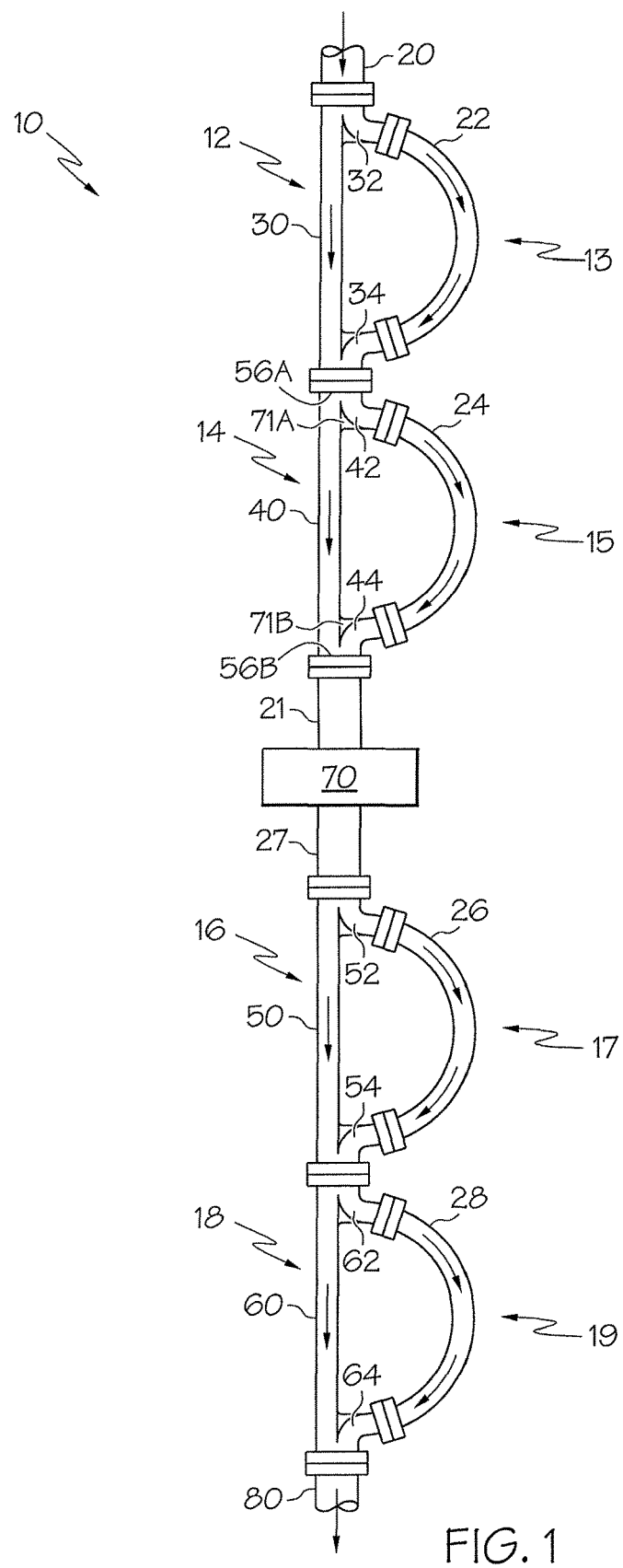
FIG. 1 is a schematic view of a 2-loop pulsation attenuation network ("PAN") to which the present invention applies.

The present invention is intended for use with a Pulsation Attenuation Network (PAN), as described in published U.S. Patent Application Nos. 2009/0038684 and 2010/0111713, both of which are incorporated herein by reference in their entirety.

The use of cyclical finite amplitude pressure wave propagation in pipes must take into account the following laws of physics: there are always two waves propagating in opposite directions within a pipe that has flow. The convention is to call one wave the right wave and the other wave the left wave. Both waves propagate without reflection as long as the cross-sectional area of the pipe stays the same. When the cross sectional area of the pipe changes, part of the wave continues to propagate and the remainder of the wave reflects in the opposite direction. When pipes branch or terminate, part of the wave continues to propagate and the remainder of the wave reflects in the opposite direction.

As a result of these phenomena, a compressor creates pulsations that propagate away from it, and piping that attaches to both the suction and discharge sides of the compressor create pulsations that propagate back to the compressor, affecting compressor performance. By properly phasing the cylinders of the compressor and/or properly choosing the lengths and diameters of pipes in fluid communication with the compressor, outward bound pulsations can be attenuated and inward bound pulsations can be used to improve the performance of the compressor.

Pulsation attenuation utilizes finite amplitude wave simulation technology or other simulation means, and includes a network of branches of pipes, called a "tuned delay loop" or "tuned loop," located upstream and downstream of a reciprocating compressor to cancel, rather than dampen, the complex pressure waves that emanate to and from reciprocating compressor cylinders. By properly phasing the cylinders of the compressor and/or properly choosing the lengths and diameters of pipes in fluid communication with the compressor, outward bound pulsations can be attenuated and inward bound pulsations can used to improve the performance of the compressor.

The tuned loops of this pulsation attenuation system typically include two conduits such as pipes of equal area and different lengths that extend from a branching device, referred to herein as a tuning section transition (TST) device (in the form of a Y-branch, a T-branch, an X-branch, or a W-branch), joined to the main pipe section. If the branch is a T-branch or an X-branch (see FIGS. 1-3), then the flow goes to the delay loop at the first branching point and then is recombined at the second branching point of the same TST device as it returns from the delay loop. The W-branch (see FIGS. 4A-4C) divides/converges flow from/into a single channel into/from three channels. The junctions/branching devices and/or TST devices disclosed herein are the subject of the present invention. They create divergence and convergence points for the tuned loops within a Pulsation Attenuation Network (PAN).

The TST provides enabling hardware for adapting the theoretical simulations of PAN technology for practical application to high-pressure reciprocating compressor systems, and it can control pulsations in the system without causing significant pressure losses in the system. Unlike traditional attenuation technology, this new cancellation technology has been shown on simulation to control pulsations to less than 1.0% peak-to-peak of the mean line pressure over a broad speed range, with less than 0.1% overall system pressure drop. This is a dramatic improvement over the existing traditional technology that has been applied for reciprocating compressor control, and is especially useful for large reciprocating compressors which operate at higher pressures (pressures much higher than 1 atmosphere, generally up to about 100 atmospheres, and often up to about 300 atmospheres or higher).

The branching devices for the pulsation attenuation devices described herein are based in whole or part on the following principles: (1) Repeating pulses with frequency F and period P are made up of the sum of an infinite series of sine waves with frequencies F, 2*F, 3*F, . . . periods P/1, P/2, P/3, . . . and amplitudes A1, A2, A3. These sine waves are normally referred to as the primary frequency, F, the first harmonic frequency, 2*F, second harmonic frequency, 3*F, and so on. This infinite series of sine waves is known as a Fourier series; (2) The sum of two sine waves of equal amplitude but 180 degrees out of phase is zero (i.e. the waves cancel each other [sin(X+180 deg)=−sin(X)]); (3) A pulse propagating down a pipe can be divided into two roughly equal parts with a Y branch; (4) If the two divided pulses travel different distances and are recombined at a later point, the different distances will time shift, i.e. phase shift, the two pulse parts; (5) The time/phase shift caused by this delay loop will cancel frequency components that have periods of 2, 6, 10, 14, . . . times the time shift if they are present in the repeating pulse; (6) The delay loop will also attenuate, that is partially cancel, all frequencies components of the pulse in between the canceled frequencies except for the frequencies that are exactly halfway in between two consecutive canceled frequencies; (7) The difference in length of the two paths can be "tuned" to one or more frequencies present in a pulse to dramatically reduce the pulsation in a conduit or duct; and (8) If the length is tuned to the rpm at which a pump is running, the pulsations will generally be substantially reduced without a significant pressure loss.

The frequency of the reciprocating compressor is the frequency at which the compressor applies its propelling force. For example, in a double acting reciprocating compressor where a single double acting piston propels fluid with each motion or stroke in both directions in a cylinder, the frequency of the pulsations will be twice the frequency of the rotating speed of the compressor.

A wavelength, for purposes of this invention, is the period of the frequency times the acoustic velocity of the fluid that the pulse is propagating in. Thus, in an embodiment wherein fluid is being pumped, the primary wavelength of a pulse is the period from one propelling motion of the reciprocation compressor to the next propelling motion of the compressor multiplied by the acoustic velocity of the fluid.

Reciprocating compressors furthermore frequently operate at various speeds. The ratio of the fastest speed to slowest speed in compression system embodiments may be a narrow, but significant range, such as a 25% turndown range. Moreover, in a natural gas compressor station, compressor speed may vary to meet a varying demand on the gas compressor system. A primary wavelength may, therefore, be established for a compressor that operates at one speed. The primary wavelength will vary when the speed of the compressor is varied. Embodiments of the present pulsation attenuation devices, networks, and methods operate to minimize pulsations created by a compressor operating over a range of speeds.

Different speed and load conditions under which a reciprocating compressor operates create different repeating pulses and create different Fourier series. Embodiments of pulsation attenuation use one or more tuned loops to effectively attenuate the critical frequencies present in the Fourier series' that characterize the speed and load range of the compressor.

It should be recognized that full cancellation may occur for sine wave frequencies when the fluid stream is divided into equal parts and recombined at 180 degrees out of phase for those sine waves. For sine waves that are recombined at 360 degrees out of phase effectively no cancellation may occur and for sine waves that are recombined at other degrees out of phase partial cancellation of those sine waves may occur. A tuned loop, also referred to as a delay loop herein, cancels a series of frequencies (i.e., a primary frequency and it's odd harmonics) and provides partial cancellation over ranges of frequencies, while leaving certain frequencies, such as even frequencies divisible by four, not effectively attenuated. Higher harmonics tend to be lower amplitude and so not as important to cancel, thus certain higher harmonics may create pulsations that are not necessary to attenuate.

A wave propagating down a pipe can be easily divided into two roughly equal parts by a branching device or TST. If the two wave parts travel different distances and are recombined at a later point, the different distances will time delay or phase shift, the two wave parts. This time/phase shift will cancel frequency components that have periods of 2, 6, 10, and 14, etc. times the magnitude of the time delay, if they are present in the repeating wave. The difference in length of the two paths can be "tuned" to the frequency of a wave to dramatically reduce the noise or pulsation in the pipe. If the difference in length is tuned to the rotating speed (rpm's) of a reciprocal compressor, the pulsations will be substantially reduced without a significant pressure loss.

Previous applications of tuning and wave cancellation technology have been applied in air or air and fuel mixtures or post-combustion exhaust gases, principally on engine intake and exhaust systems, operating at pressures that are at atmospheric pressure or within about 3 to 4 atmospheres of pressure. As such, the systems were usually small, compact and the branches can be fabricated from thin steels or stainless steel tubing by various production means. In contrast, the application of tuning and wave cancellation at elevated pressures on compressors that may have ports or flange sizes ranging from as small as about 1 inch in diameter to as large as about 24 inches or more in diameter will require that heavy tuning systems be precisely and accurately designed and fabricated in segments that are small enough for practical manufacture, shipment, lifting and erection. The TSTs or branching devices of the present invention overcome this problem by providing the most complex and geometrically sensitive element of the tuned loop system, the branch or junction, which then enables the rest of the system to be constructed of properly dimensioned and fabricated standard size industrial pipes and fittings. Without such enabling branching devices, the prevalent skill sets and cost constraints that prevail in the gas compression industry make the fabrication of PAN systems prohibitively difficult, expensive and sensitive to construction errors, rendering PAN technology non-competitive, despite its benefits.

Because all reciprocating compressor systems, other than atmospheric air compressors, are closed systems (i.e., sealed from the atmosphere) and carry flammable and explosive, and often lethal, gases at high pressure, the TST branching devices of the present invention are designed to safely contain and divide typically 10 to 70 Hz, 5 to 100 psi pulses propagating in a 1200 to 1500 psig natural gas pipe. The TSTs must therefore withstand the maximum allowable working pressure of the system in which it is applied, as well as the time variant pressures in the system. These pressures can range from between about 125 psig to about 2500 psig, more typically between about 1000 psig to about 2000 psig, and even more typically between about 1200 psig to about 1500 psig. The TST can utilize standard or custom-designed flanged connections that can be secured by threaded fasteners, clamps or other means. In certain cases, the TST can be prepared with beveled ends that enable it to be welded directly to pipes. The TST is designed to permit the use of standard, commercially available industrial pipes and fittings for the rest of the pulsation attenuation network system.

Flanged joints, which are necessary for segmental fabrication of the PAN systems, must be robust, rigid and 100% leak-tight under all operating conditions, including the effects of the high mean pressure, significant cyclic pressure, elevated temperature and mechanical excitations induced from the compressor and its driver, which is most typically a natural gas reciprocating engine. In some cases, where segmental fabrication is not required, it is practical to eliminate the flanged joints and weld the TST directly into the piping. In such cases, welds must meet ASME Boiler and Pressure Vessel Code requirements for strength, quality and leak resistance.

As illustrated in FIG. 1, T-type branching devices 12, 14, 16, 18 of the invention are employed in a system in which a reciprocating compressor cylinder 70 is equipped with a 4-loop Pulsation Attenuation Network (PAN) 10. Fluid flow is in the direction of the arrows. This PAN embodiment includes four tuned loops 13, 15, 17 and 19, with two suction tuned loops or branches 13, 15 located on the upstream or suction side of the compressor cylinder 70 and two discharge tuned loops 17, 19 located on the downstream or discharge side of the compressor cylinder 70. Upstream of the compressor, two "T-branch" TSTs 12, 14 are joined together, along with two external attenuating conduits (or legs) 22 and 24, to create divergence and convergence points of loops 13 and 15.

The incoming suction pipe line or main pipe 20 serves as an inlet conduit, and is split by the first T-branch TST 12 into a first small flow channel, or internal attenuating conduit 30 which serves as a first leg (having a length, $L_1$) and a second small flow channel or branching outlet 32. The branching outlet 32 of the TST 12 is joined to a branch line 22 or second leg or (having a length, $L_2$), also referred to herein as an external attenuating conduit 22. The length of the (longer) external attenuating conduit 22 minus the length of the (shorter) internal attenuating conduit 30 within the TST 12 causes the time delay or phase shift. The two attenuating conduits 30, 22 are merged back together at the distal end of the first T-branch TST 12 by the joining of leg 22 with a third small flow channel or branching inlet 34. The branching inlet 34 is joined with the internal attenuating conduit 30 within the distal end or main outlet of the first T-branch TST 12.

The distal end of the first TST 12 is connected to the main inlet 56A at the proximal end of a second TST 14. A first divider 71A within the second TST 14 then divides the incoming flow into a first small flow channel or internal attenuating conduit 40 which serves as a third leg (having a length, $L_3$) and a second small flow channel or branching outlet 42 which is joined to a fourth leg or branch line 24 (having a length, $L_4$), also referred to herein as an external attenuating conduit. The length of the long fourth leg 24 (i.e. the external attenuating conduit) minus the length of the shorter third leg 40 (i.e. the internal attenuating conduit) causes the time delay or phase shift. The two attenuating conduits 40 and 24 are merged back together at a second divider 71B near the distal end of the second T-branch TST 14 by the joining of leg 24 with a third small flow channel or branching inlet 44. The branching inlet 44 is joined with the internal attenuating conduit 40 near the distal end or main outlet 56B of the second T-branch TST 14.

The main outlet of the second TST 14 is then connected to an outlet conduit such as a compressor suction nozzle pipe 21. The internal flow area of the legs or attenuating conduits 30, 22, 40 and 24 are approximately one-half of the flow area of the inlet conduit or incoming main pipe 20 and also approximately one-half of the flow area of the outlet conduit or compressor suction nozzle pipe 21, while the main inlets and outlets of the TST devices 12, 14 have internal flow areas that are approximately equal to the inlet conduit 20 or outlet conduit 21.

Still referring to FIG. 1, a compressor discharge nozzle pipe 27 exits the compressor cylinder 70. Downstream of the compressor 70, two more T-branch TSTs 16, 18 are joined together, along with legs 26 and 28, to create divergence and convergence points for loops 17 and 19. The discharge nozzle pipe 27 serves as an inlet conduit for the T-branch TST 16, and inflow is split by a divider within the TST 16 into an internal attenuating conduit 50 or first small flow channel which serves as a fifth leg (having a length, $L_5$), and a branching outlet 52 or second small flow channel which is joined to a sixth leg or branch line 26 (having a length, $L_6$), also referred to as an external attenuating conduit 26. The length of the (longer) external attenuating conduit 26 minus the length of the (shorter) internal attenuating conduit 50 causes the time delay or phase shift. The two attenuating conduits 50 and 26 are merged back together at the distal end of the third T-branch TST 16 by the joining of leg 26 with a third small flow channel or branching inlet 54. The branching inlet 54 is joined with the internal attenuating conduit 50 at main outlet or distal end of the first T-branch TST 16.

The main outlet of the third TST 16 is connected to the proximal end or main inlet of the fourth TST 18. The fourth TST 18 then divides the incoming flow into a first small flow channel or internal attenuating conduit 60 which serves as a seventh leg (having a length, $L_7$) and a second small flow channel or branching outlet 62 which is joined to an eighth leg or branch line 28 (having a length, $L_8$), also referred to as an external attenuating conduit 28. The length of the long eighth leg 28 (i.e. the external attenuating conduit) minus the length of the shorter seventh leg 60 (i.e. the internal attenuating conduit) causes the time delay or phase shift. The two attenuating conduits 60 and 28 are merged back together at the distal end of the fourth T-branch TST 18 by the joining of the external attenuating conduit 28 with a third small flow channel or branching inlet 64. The branching inlet 64 is joined with the internal attenuating conduit 60 near the distal end or main outlet of the fourth T-branch TST 18.

The distal end of the fourth TST 18 is then connected to an outlet conduit such as a discharge line 80. The internal flow area of attenuating conduits 50, 26, 60 and 28 are approximately one-half of the flow area of the inlet conduit or discharge nozzle pipe 27 at the loop entrance, and also approximately one-half of the flow area of the outlet conduit or discharge line 80 at its exit, while the main inlets and outlets of the TST devices 16, 18 have internal flow areas that are approximately equal to the inlet conduit 27 or outlet conduit 80. Further, the flow areas of the TST's 12, 14, 16 and 18 in FIG. 1 are held at a substantially constant amount as they transition shape from a common large inlet area to two smaller flow areas. This geometric control must include careful attention to avoiding potential flow velocity change, separation and eddies that would create turbulent flow, with attendant pressure losses.

Figure 2:
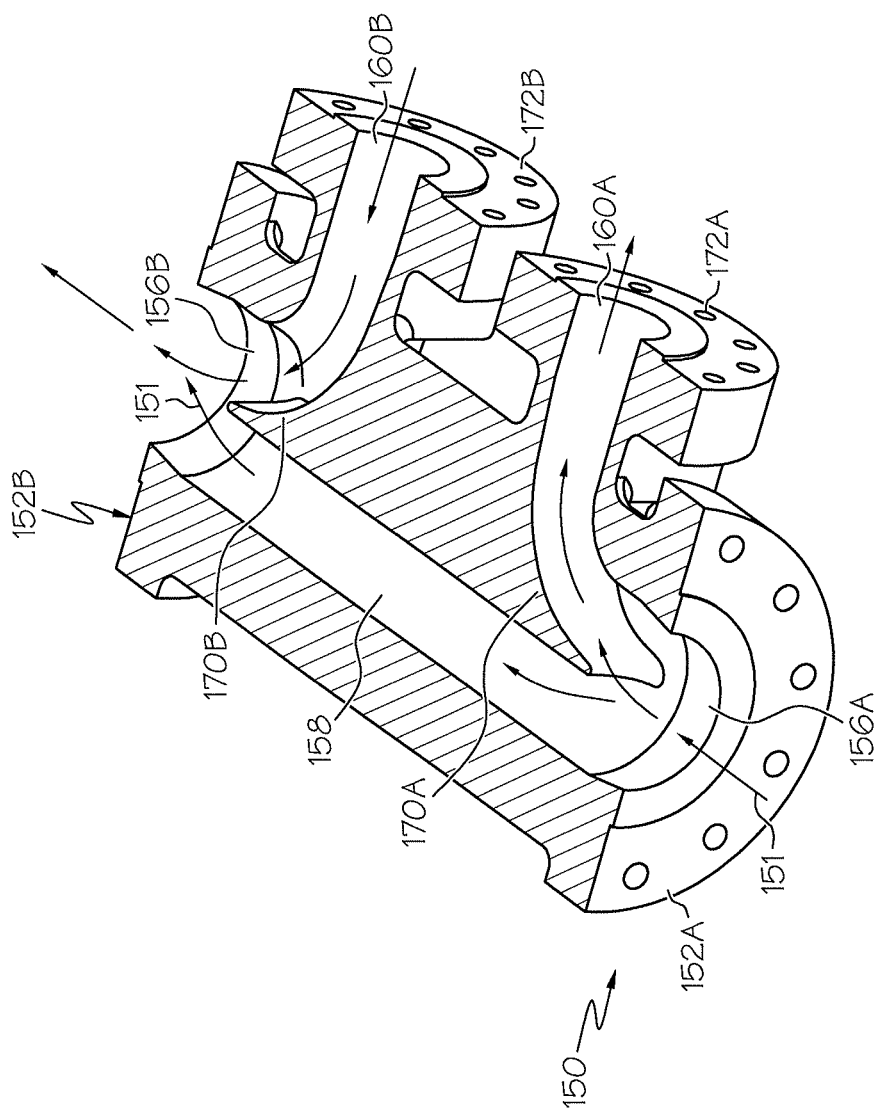
FIG. 2 is a schematic view of one embodiment of a tuning section transition (TST) as a "T-branch", incorporating two branches in a single mechanical element having two legs on the same side of the element.

FIG. 2 shows more detail of one embodiment of the invention, which is a T-shaped branching device 150 (or TST) which contains both the divergent and convergent transitions within a single body. This TST device 150 is for use in a pressure wave attenuation device (or pulsation attenuation device or PAN) having at least one tuned loop.

The device 150 includes an inlet junction 156A which can be coupled to an inlet conduit, such as the inlet conduit 20 of FIG. 1. The inlet junction 156A branches into an internal attenuating conduit 158 and a branching outlet 160A, both of which have smaller flow channels than the inlet junction yet maintain substantially the same flow area along their length. The branching outlet 160A of the TST 150 is typically coupled to a first end of a branch line which is typically not a part of the TST device, also referred to as an external attenuating conduit (see elements 22, 24, 26 and 28 of FIG. 1).

The inlet conduit leading to the main inlet 156A (e.g. line 20, illustrated in FIG. 1) is a pipe having a length, an internal diameter, and an internal area. Similarly, the internal attenuating conduit 158 and the branching outlet 160A are pipes and each has a length, an internal diameter, and an internal area. Other conduits discussed herein may have various shapes (e.g., round or rectangular), but those conduits generally also have a length and an internal area. The dimensions (e.g., length and area) of those conduits (e.g., 156A, 158, 160A) furthermore affect various aspects of system operation as discussed herein.

It should be noted that the terms "branching device", "TST" or "junction" as used herein includes any connecting device to which three or more conduits may be coupled, including, for example, the (double) T-shaped branch, an X-shaped branch, or a W-branch formed on or with a conduit. See FIGS. 2-4. In the disclosed T- and X-branch embodiments, the main inlet, main outlet, the internal attenuating conduit and the branching inlet and outlet are formed as a single entity. To complete a single tuned loop, typically one T- or X-branch TST is connected to one external attenuating conduit. In certain embodiments, the external attenuating conduits (e.g. elements 22, 24, 26 and 28 of FIG. 1) are formed straight, angled, curved, or otherwise to meet the desires or constraints of an application, such as to minimize the size of the pulsation attenuation device. The pulsation attenuation device in turn may carry a pressurized fluid, such as, for example, natural gas. The main inlet 156A may be arranged in fluid communication with a pump or compressor cylinder, such as for example the compressor cylinder 70 illustrated in FIG. 1, applying pressure to the fluid. The main outlet 156B may be in fluid communication with a system (not shown) to which the pressurized fluid is carried. Fluid communication with either the compressor or the system may, for example, be accomplished by direct coupling or through additional conduits. The tuned loop (e.g. elements 13, 15, 17 and 19 of FIG. 1) may attenuate pressure fluctuations, variations, or waves in a primary pressure wavelength propagated in the fluid and odd harmonics of that primary pressure wavelength.

In FIG. 2, the T-shaped branching device 150 includes two large sealing flanges or connections, 152A and 152B, with an internal port that has two large flow areas, namely the main inlet 156A and the main outlet 156B. Direction arrows 151 indicate the direction of flow through the device. Internally, the main inlet 156A transitions from a single channel to an internal attenuating conduit 158 and a branching outlet 160A. A first divider 170A splits the incoming flow from the large main inlet 156A to the internal attenuating conduit 158 and the branching outlet 160A. This divider 170A is typically in the form of a tongue or splitter, and initiates the separation of flow as natural gas or other fluid enters the main inlet 156A. Typically fluid exits the TST 150 via the divergent flow channel of the branching outlet 160A, traverses a long leg or loop (e.g. legs 22, 24, 26 or 28 of FIG. 1), and then returns to the same side of the branching device 150 via the convergent flow channel of branching inlet 160B. The branching inlet 160B is then joined with the internal attenuating conduit 158 at the second divider 170B to form the main outlet 156B.

Typically the TST 150 of FIG. 2 has large conduit connections 152A and 152B at both ends of the main body, as well as two smaller branch line connections 172A and 172B at the ends of the branching outlet 160A and branching inlet 160B. In different embodiments of the TST, the branching inlet and outlet may be on the same side, such as the T-branch shown in FIG. 2, or on opposite sides, such as shown in the X-branch of FIG. 3, or in other configurations that facilitate the installation of the PAN loops in areas with space constraints. While the flow direction arrows 151 indicate one possible direction of flow through the device, it can be appreciated that flow can also be in the reverse direction. In the case of reverse flow, the designation of outlets and inlets (i.e. 156A, 156B, 160A, 160B) would be reversed as well.

A standard sized main pipe typically ranges from between about 4 inches to about 24 inches in diameter, so that the large connections 152A-B can be connected thereto. Internally, the main inlets/outlets 156A/156B of the TST carefully and gently transition from a single large flow area into smaller flow channels which can be, but are not limited to, between about 45% to about 55% of the large flow area, but may also be as little as about 25% or as large as 75% of the large flow area. Typically, however, the small flow channels of the T-branch and X-branch TST embodiments disclosed herein are about 50% or less than the large flow area. Internal passage wall surfaces are generally smooth and continuous, and the overall internal flow area of the TST remains constant throughout its flow path, within a tolerance of typically, but not limited to, plus or minus 5%.

At an appropriate internal distance, which typically equals a length equivalent to as little as ½ diameter to as much as 3 diameters, but typically in the range of 1 diameter, along the center of the main inlet/outlet 156A/156B, a transition begins that separates the large flow area into two individual smaller channels. The tongues or dividers 170A/B, which initiate the separation and recombination of the flow channels, are configured with an aerodynamic profile. The angle that a divider splits the large flow area into the smaller flow channels can be determined on a case by case basis, but typically angles of 30° to 60° are used to prevent the creation of significant disturbances in the flow patterns.

A TST of the invention can typically accommodate flow in either direction, that is (looking at FIG. 2), either flow entering the device at the main inlet 156A or flow entering at the opposite end or main outlet 156B. This allows the device to be applied to either a divergence point or a convergence point in a tuned loop. The geometry of the TST may be in the shape of a Y-branch (not shown), a T-branch (FIGS. 1 and 2), an X-branch (FIG. 3) or a W-branch (FIGS. 4A-4C), or in other complex shapes that facilitate the installation of a specific PAN. In order to save space, cost and installation time, the short leg of the tuned loop can be included completely within the TST branching device, as seen in FIGS. 1-3 (i.e. the internal attenuating conduits 30, 40, 50 and 60 of FIG. 1, 158 of FIG. 2, and 258 of FIG. 3); the length of this internal attenuating conduit is variable, and can be manufactured on a case by case basis according to the parameters required for a particular application.

Figure 3:
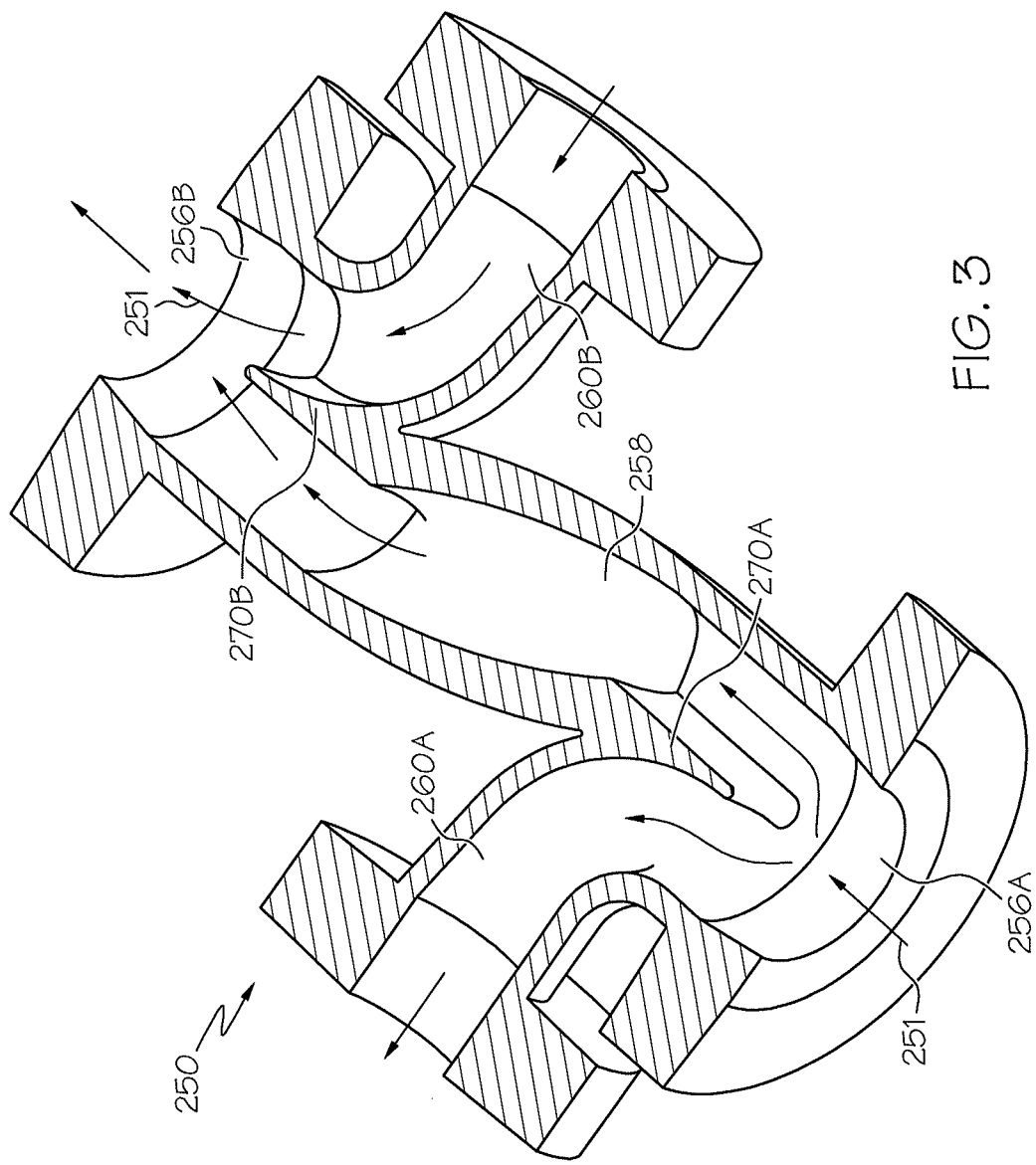
FIG. 3 is a schematic view of embodiment of a TST as an "X-branch", incorporating two branches in a single mechanical element having two legs on opposite sides of the element.

In another embodiment of the invention, illustrated in FIG. 3, an X-shaped branching device 250 includes an internal port that has two large entrance or flow areas, namely the main inlet 256A and the main outlet 256B. Direction arrows 251 indicate the direction of flow through the device. Internally, the main inlet 256A transitions from the single, large flow channel of the main inlet 256A into two smaller flow channels, namely an internal attenuating conduit 258 and a branching outlet 260A. A first divider 270A splits the incoming flow from the large main inlet 256A to the internal attenuating conduit 258 and the branching outlet 260A. This divider 270A is typically in the form of a tongue or splitter, and initiates the separation of flow as natural gas or other fluid enters the main inlet 256A. Once the fluid is split by the divider 270A, approximately half of the fluid exits the TST body via branching outlet 260A, traverses a long external branch line (e.g. legs 22, 24, 26 or 28 of FIG. 1), and then returns to the opposite side of the branching device 250 via the convergent flow channel or branching inlet 260B. The branching inlet 260B with its small convergent flow is then joined with the small flow area of the internal attenuating conduit 258 at the second divider 270B to form a second large flow channel at the main outlet 256B.

The main inlets/outlets 256A/256B of the X-branch TST shown in FIG. 3 are specifically designed to carefully and gently transition from a single large flow area into smaller flow channels which can be, but are not limited to, between about 45% to about 55% of the large flow area, but may also be as little as about 25% or as large as 75% of the large flow area. Typically, however, the small flow channels are about 50% of the large flow area. Internal passage wall surfaces are generally smooth and continuous, and the overall internal flow area of the TST remains constant throughout its flow path, within a tolerance of typically, but not limited to, plus or minus 5%. The tongues or dividers 270A/B, which initiate the separation and recombination of the flow channels, are configured with an aerodynamic profile. The angle that the dividers split the large flow area into the smaller flow channels can be determined on a case by case basis, but typically angles of 30° to 60° are used to prevent the creation of significant disturbances in the flow patterns.

Figure 4A:
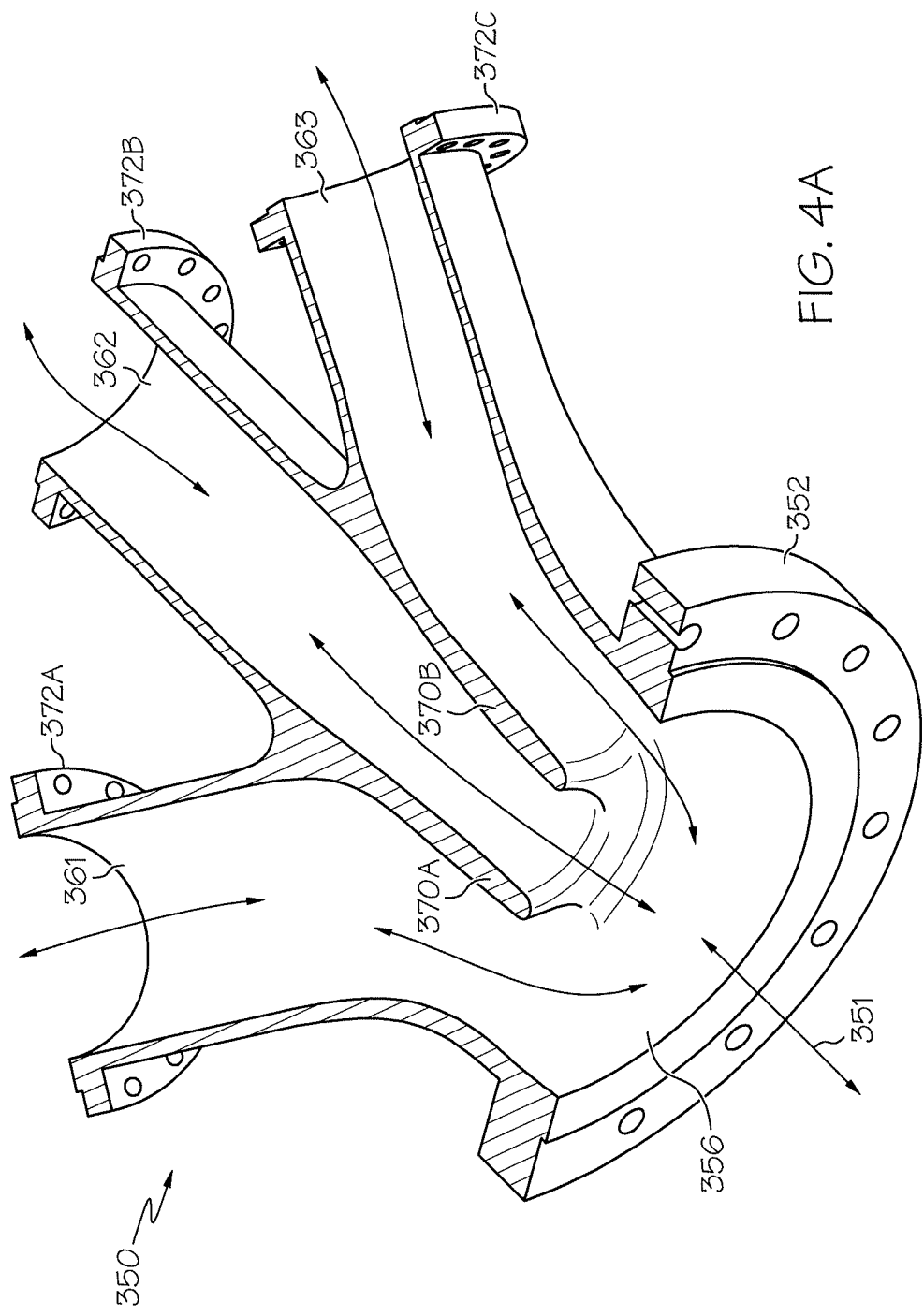
FIG. 4A illustrates a schematic view of one embodiment of a TST as a "W-branch, incorporating three branches in a single mechanical element having three legs on the same side of the element.
Figure 4B:
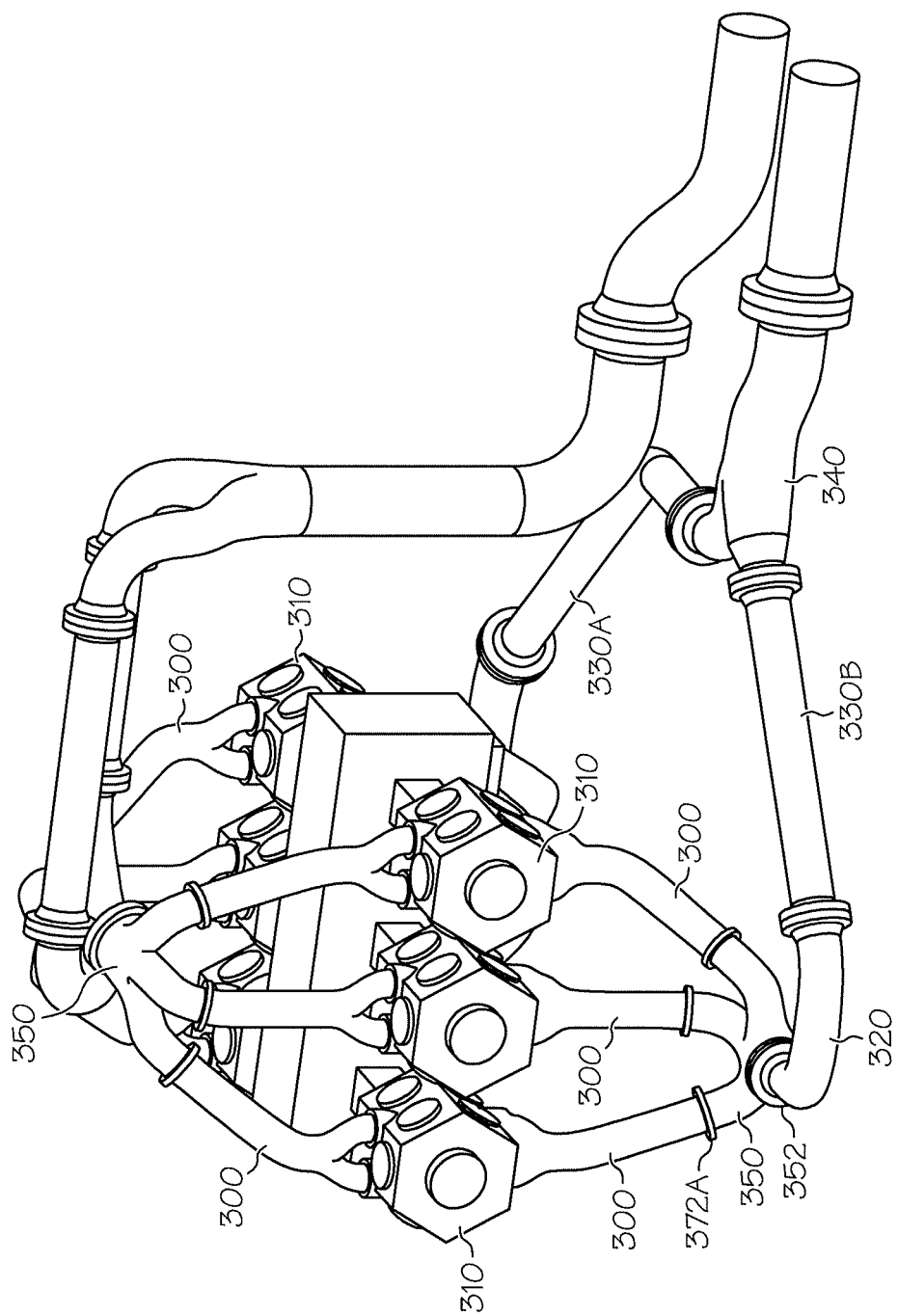
FIGS. 4B and 4C illustrate schematic views of a "W-branch" embodiment as incorporated into similar versions of a pulsation attenuation network.
Figure 4C:
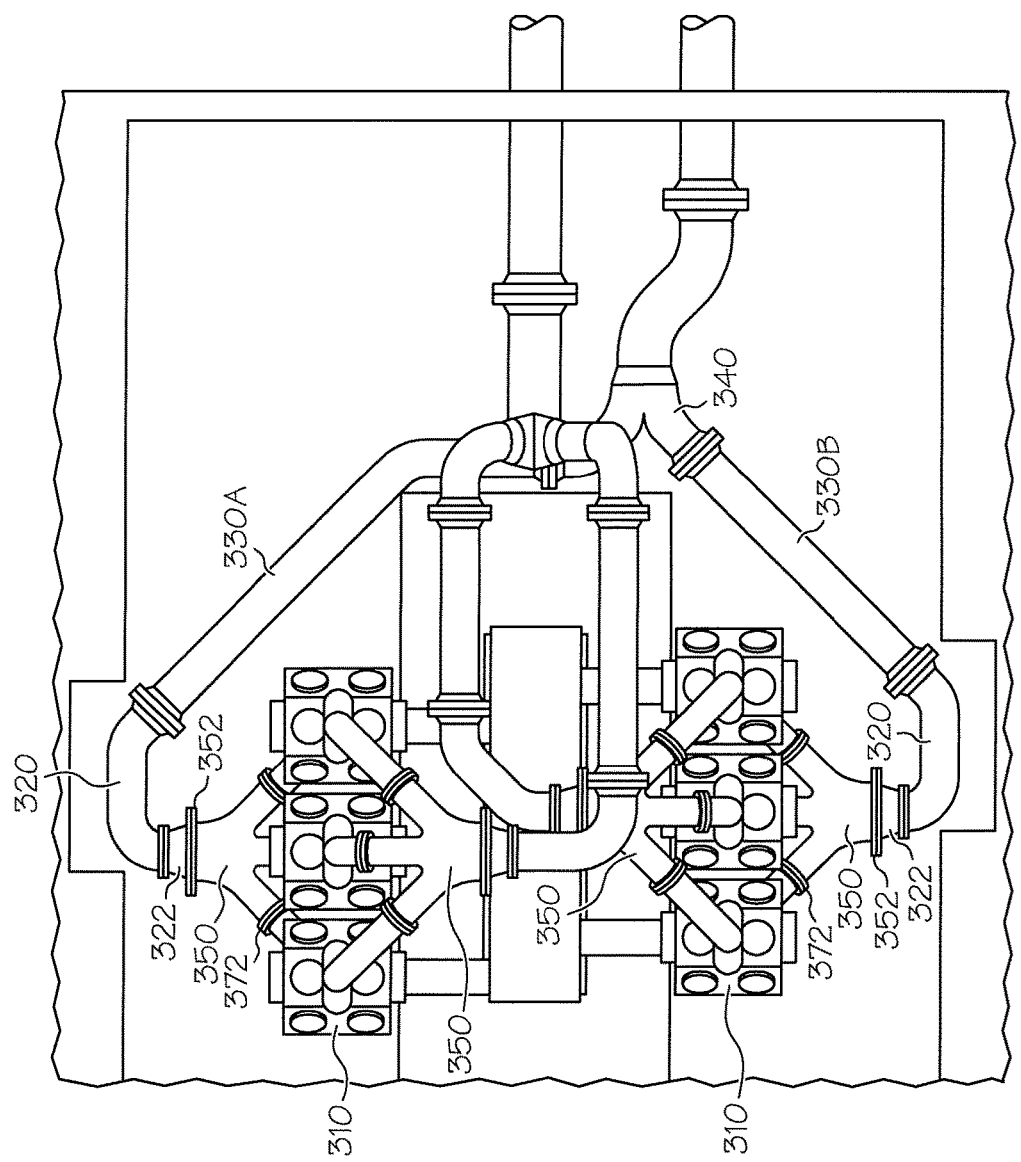

FIGS. 4A-4C disclose another embodiment of a branching device for use with a pulsation attenuation network, the W-branch. As seen in FIG. 4A, a W-shaped branching device 350 includes an internal port that has a single large entrance or flow area, namely the main inlet 356. Direction arrows 351 indicate the direction of flow through the device, which can be in either direction. Internally, the main inlet 356 transitions from the single, large flow channel into three smaller flow channels, namely branching outlets 361, 362 and 363. Two dividers 370A and 370B split the incoming flow from the large main inlet 356 into the three branching outlets 361-363. The dividers 370A, 370B are typically in the form of a tongue or splitter, and initiate the separation of flow as natural gas or other fluid enters the main inlet 356. Once the fluid is split by the dividers 370A, 370B, approximately one-third of the fluid exits the TST body via each branching outlet 361-363. A large conduit connection or flange 352 typically joins the main inlet 356 to an inlet or outlet conduit of the network, as well as three smaller connections/flanges 372A, 372B and 372C for joining network conduits to the ends of the branching outlets 361, 362 and 363.

It should be noted that the terms "outlet" or "inlet" can be used for the same flow area depending on the direction of fluid flow, such that fluid can flow in either direction through the W-branch. Thus, depending on the direction of flow, the main inlet can be a main outlet, and the three branching outlets can serve as branching inlets. Therefore, looking at FIG. 4A, flow can progress through the branching inlets 361, 362, 363 and be joined by the dividers 370A and 370B into the main outlet 356, or flow can progress through the main inlet 356 and be divided by the two dividers 370A, 370B into the three branching outlets 361, 362, 363.

Internally, standard sized main conduits range from between about 4 inches to about 24 inches in diameter, and small conduits range from between about 2 inches to about 12 inches in diameter. The main inlet 356 and dividers 370A, 370B of the W-branch TST shown in FIG. 4A are designed to carefully and gently transition fluid flow from each individual flow area of the branching outlets 361, 362, 363 (e.g., 12" in diameter) into the single flow area of the main inlet 356 (e.g., 24" diameter), and vice versa. The small flow channels of the branching outlets 361, 362, 363 can be, but are not limited to, between about 25% to about 45% of the large flow area, but may also be as little as about 15% or as large as 65% of the large flow area. Typically, however, the small flow channels are about 33% of the large flow area.

Internal passage wall surfaces are generally smooth and continuous, and the overall internal flow area of the TST remains constant throughout its flow path, within a tolerance of typically, but not limited to, plus or minus 5%. The tongues or dividers 370A/B, which initiate the separation and recombination of the flow channels, are configured with an aerodynamic profile.

Looking at FIG. 4B, inlet conduits 300 extending from above and below each compressor cylinder 310 can merge on each side of the compressor into each of the three branching outlets (361, 362 and 363 of FIG. 4A) of the TST 350. The main outlet of the W-branch 350 connects via flange 352 to an outlet conduit 320 of the pulsation attenuation network, and each branching inlet connects via flange 372A (B, C) to an inlet conduit 300 leading from the compressor cylinders 310 of the pulsation attenuation network. As can be appreciated from viewing FIG. 4B, the W-branches 350 are useful for both the suction and the discharge sections for each side of the compressor.

The timing of the crankshaft throws can result in a natural cancellation of the pulses joined together in the W-Branch. This effect is further enhanced by unloading all ends of all compressor cylinders 310 equally. This characteristic is an important aspect to try to utilize in pulsation control. As can be seen in FIG. 4C, a transition nozzle 322 can be joined to the large (e.g. 24") flow end (i.e. the main inlet 356) of the W-Branch. This transition nozzle 322 can gently change the diameter of the conduit connected to the main outlet from a large, 24-inch diameter to a smaller diameter of, for example, 16 inches. A transition nozzle can be employed when a larger (i.e. 24") diameter is required to effectively merge flows joining in the main outlet 356 that are coming from the three smaller (e.g. 12") conduits. This large size for the main outlet 356 is typically larger than necessary for efficient continuous flow therethrough. The transition nozzle, therefore, efficiently reduces the flow area to permit the use of smaller diameter piping 320, 330A/B, 340, in this case 16", which reduces the PAN system space requirement and cost.

FIG. 4C shows a top view of the PAN system of FIG. 4B. In order to fit the discharge PAN into the existing pit area, it was necessary to extend the pit slightly on each side of the unit. The view shows different 16" diameter pipe lengths serving as outlet conduits 330A, 330B on the two sides of the compressor, which join at a Y-Branch 340. Standard pipe and elbows are used for the piping between the W-Branch and Y-Branch. Although the W-branch is not part of a tuned loop, the different pipe lengths of the conduits 330A, 330B leading from the W-Branch to the Y-Branch create a phase delay that provides further pulsation cancellation.

In the embodiments of the TST shown in FIGS. 1 through 4C, the branching device typically accommodates flow in either direction; that is, fluid flow can enter or exit the device at either end. In the T- or X-branches of FIGS. 1-3, about half of the flow stream continues straight through the internal attenuating conduit of the TST and the other half of the flow stream diverts to the delay loop at the first branching point of the device and then is recombined within the same TST body at the second branching point as it returns from the delay loop. Direction arrows 151, 251 and 351 in FIGS. 2, 3 and 4A, respectively, indicate one possible direction of flow through the device. However, flow can also be in the reverse direction.

Each TST is designed for a specific maximum working pressure, which is typically, but not limited to, between about 125 to about 2500 psig, more typically in between about 1000 psig to about 2000 psig, and even more typically between about 1200 psig to about 1500 psig. The TST is designed to safely contain the pressure of the working fluid within. It is typically constructed to have walls that are at least ¼ of an inch thick, and more typically ⅜ of an inch thick, and up to as much as 2 inches or more in thickness, depending on the maximum design working pressure, in order to withstand the external forces and moments caused by the high pressures, thermal expansion acting on the piping system, heavy weight and bending moments of connected piping, and to resist mechanical vibration imparted from the reciprocating compressor and engine driver. The TST may be constructed from cast, forged, wrought, or welded materials, either from a single element of raw material or by the joining of two or more elements by welding or bolting together of sealed, flanged joints, and it may be produced to near net shape via casting or welding of fabricated shapes, or machined from a solid block of material, or otherwise fabricated via other common manufacturing methods. The TST may be connected to adjacent pipes or flanges via bolted flanges, welding, compression sleeves or other means that are leak free and pressure tight. The TST may include internal sleeves or liners for the purpose of changing the geometry, adapting the area to standard pipe sizes, providing renewable flow surfaces, or for other purposes.

The TSTs disclosed herein are special precision fittings that allow the fabrication of tuned manifold systems for high-pressure gas compressor piping systems. In addition to customized TST designs and applications (i.e. non-standard branching configurations that are not pre-engineered and can be custom made for different angles, special pressure ratings, special mating pipe sizes, different connection means, or imbedded short pipe sections), TST configurations may include entire families of standard versions such as those disclosed herein that match the required geometries, pipe flange sizes and pressure ratings prevalent in industrial reciprocating compressor applications. This will reduce the cost and increase the availability and ease of application of the new pulsation attenuation technology.

The branching devices of the present invention are typically constructed to provide structural integrity, safety and environmental leakage containment of any gas, including explosive, hazardous, lethal, or toxic gases, required at the divergence and convergence points of the tuned loops or branches used for Pulsation Attenuation Networks, and are capable of safe operation at elevated pressures.

When dealing with high-pressure, high density compressed gases flowing within a channel or pipe, the pressure losses created by transitions from one channel to another, or by bends or restrictions, can be significant. A feature of the TSTs therefore, is that the flow channel is held at a constant area as it transitions in shape from a common large pipe connection to two smaller pipe connections. This geometric control must include careful attention to avoiding potential flow separation and eddies that would create turbulent flow, with attendant pressure losses.

In addition to the use in cancelling pulsations from reciprocating compressor piping systems without creating pressure losses, an important use of the TSTs disclosed herein is to enable the fabrication of tuned manifolds (without using pulsation bottles), such as those shown in FIGS. 4A-4C, from high-pressure piping, such that not only are pulsations efficiently cancelled, the pressure waves are reflected back to the compressor cylinder flanges at precise times such that the inlet or suction pressure is increased when the compressor suction valves are open and the exit or discharge pressure is decreased when the compressor discharge valves are open, such that the work or adiabatic power required from the compressor cylinder is reduced. This provides a more efficient utilization of the compressor, delivering a given flow rate with less power input. Another application for which TSTs are suited include one or more tuned delay loops upstream and/or downstream of gas flow meters for the purpose of reducing and substantially eliminating pulsations (time varying pressure and flow fluctuations) that affect the function, accuracy, and/or reliability of the flow meter.

Yet another application for which TSTs are suited include one or more tuned delay loops upstream and/or downstream of centrifugal compressors for the purpose of reducing and substantially eliminating pressure pulsations that momentarily increase and decrease the head required from the centrifugal compressor. Such momentary variations in required compressor head, or pressure ratio, can lead to compressor surge, which is a damaging operating situation that must be avoided for safety and reliability to be achieved. PAN technology is utilizable for reciprocating compressor systems operating in any kind of operation or service with any gaseous fluid at any pressure, temperature or flow condition. By employing finite amplitude wave simulation technology via a network of single or multiple sequential tuned loops of pipe, connected by the tuning section transition devices of the present invention, the PAN can cancel, rather than dampen, the complex pressure waves that emanate from reciprocating compressor cylinders, without causing significant system pressure losses.

The TST or branching device of the present invention will enable and greatly simplify the fabrication and cost of the tuned loops for the PAN system, while providing precise internal transition geometry at the divergence and convergence of the tuned loops or branches. It can enable the advancement and application of the PAN system technology into industrial and commercial applications that utilize reciprocating compressors.

While the present invention has been illustrated by the description of embodiments and examples thereof, it is not intended to restrict or in any way limit the scope of the appended claims to such detail. Additional advantages and modifications will be readily apparent to those skilled in the art. Accordingly, departures may be made from such details without departing from the scope or spirit of the invention.

What is claimed is:

1. A pulsation attenuation network comprising a branching device, the branching device comprising:
    i) two large flow channels comprising a main inlet and a main outlet;
    ii) three small flow channels comprising an internal attenuating conduit, a branching outlet, and a branching inlet, wherein all of the flow channels are in fluid communication with one another and contained by walls having a thickness of at least ¼ of an inch to withstand the high fluid pressure created within the pulsation attenuation network, wherein the main inlet is connected to an inlet conduit of the pulsation attenuation network, the main outlet is connected to an outlet conduit of the pulsation attenuation network, the branching inlet is connected to a first end of an external attenuating conduit of the pulsation attenuation network, and the branching outlet is connected to a second end of the external attenuating conduit of the pulsation attenuation network; and
    iii) two dividers comprising a first divider for dividing the flow of fluid from the main inlet into the internal attenuating conduit and the branching outlet, and a second divider for joining the flow of fluid from the branching inlet and the internal attenuating conduit into the main outlet,
    wherein the branching device can safely contain and divide 10-70 Hz, 5-100 psi pulses propagating in a 500-1500 psig natural gas pipe, and wherein the main inlet, the main outlet, the branching outlet and the branching inlet each include a flanged joint for coupling the branching device to the pulsation attenuation network.

2. The branching device of claim 1, wherein the branching outlet and the branching inlet are on the same side of the device.

3. The branching device of claim 1, wherein the branching outlet and the branching inlet are on opposite sides of the device.

4. The branching device of claim 1, wherein the device can accommodate flow in either direction.

5. A pulsation attenuation network comprising a branching device, the branching device comprising:
    i) two large flow channels comprising:
        a. a main inlet; and
        b. a main outlet;
    ii) three small flow channels comprising:
        c. an internal attenuating conduit;
        d. a branching outlet; and
        e. a branching inlet, wherein the main inlet, the main outlet, the internal attenuating conduit, the branching outlet and the branching inlet are in fluid communication with one another and contained by walls having a thickness of at least ¼ of an inch to withstand the high fluid pressure created within the pulsation attenuation network, and wherein the main inlet is connected to an inlet conduit of the pulsation attenuation network, the main outlet is connected to an outlet conduit of the pulsation attenuation network, the branching inlet is connected to a first end of an external attenuating conduit of the pulsation attenuation network, and the branching outlet is connected to a second end of the external attenuating conduit of the pulsation attenuation network;
    iii) a first divider adapted to divide the flow of fluid from the main inlet into the internal attenuating conduit and the branching outlet; and
    iv) a second divider adapted to join the flow of fluid from the branching inlet and the internal attenuating conduit into the main outlet,
    wherein the branching device can safely contain and divide 10-70 Hz, 5-100 psi pulses propagating in a 500-1500 psig natural gas pipe, and wherein each of the main inlet, the main outlet, the branching outlet and the branching inlet include a flanged joint for coupling the branching device to the pulsation attenuation network.

6. The branching device of claim 5, wherein the branching outlet and the branching inlet are on the same side of the device.

7. The branching device of claim 5, wherein the branching outlet and the branching inlet are on opposite sides of the device.

8. The branching device of claim 5, wherein the device can accommodate flow in either direction.

9. The branching device of claim 5, wherein the flow areas of the main inlet and the main outlet are substantially the same, and wherein the flow areas of the internal attenuating conduit, the branching outlet, and the branching inlet are between 45% to and 55% of the main inlet.

10. A pulsation attenuation network comprising a branching device, the branching device comprising:
  a. a main inlet comprising a large flow channel;
  b. three small flow channels comprising:
    i) a first branching outlet;
    ii) a second branching outlet; and
    iii) a third branching outlet, wherein the main inlet, the first branching outlet, the second branching outlet, and the third branching outlet are in fluid communication with one another and contained by walls having a thickness of at least ¼ of an inch to withstand the high fluid pressure created within the pulsation attenuation network, wherein the main inlet is connected to an outlet conduit of the pulsation attenuation network, and wherein the first branching outlet, the second branching outlet, and the third branching outlet are each connected to separate inlet conduits of the pulsation attenuation network; and
  c. two dividers for transitioning the main inlet into the three branching outlets, wherein the branching device can safely contain and divide 10-70 Hz, 5-100 psi pulses propagating in a 500-1500 psig natural gas pipe, and wherein each of the main inlet, the first branching outlet, the second branching outlet and the third branching outlet include a flanged joint for coupling the branching device to the pulsation attenuation network.

11. The branching device of claim 10, wherein the device is adapted to accommodate flow in either direction, that is, either flow entering the device at the main inlet and exiting through the three branching outlets, or flow entering at the three branching outlets and exiting through the main inlet.

12. In a reciprocating compressor system, a pulsation attenuation network comprising a tuned delay loop for cancellation of pulsations, the tuned delay loop comprising:
  a. an external attenuating conduit forming the loop portion of the tuned delay loop; and
  b. a branching device for directing fluid flow through the tuned delay loop, wherein the branching device comprises:
    1. two large flow channels comprising:
      i. a main inlet; and
      ii. a main outlet;
    2. three small flow channels comprising:
      iii. an internal attenuating conduit;
      iv. a branching outlet; and
      v. a branching inlet, wherein the main inlet, the main outlet, the internal attenuating conduit, the branching outlet and the branching inlet are in fluid communication with one another and contained by walls having a thickness of at least ¼ of an inch to withstand the high fluid pressure created within the pulsation attenuation network, and wherein the main inlet is connected to an inlet conduit of the pulsation attenuation network, the main outlet is connected to an outlet conduit of the pulsation attenuation network, the branching inlet is connected to a first end of an external attenuating conduit of the pulsation attenuation network, and the branching outlet is connected to a second end of the external attenuating conduit of the pulsation attenuation network;
    3. a first divider for directing the flow of fluid from the main inlet to the internal attenuating conduit and the branching outlet; and
    4. a second divider for directing the flow of fluid from the branching inlet and the internal attenuating conduit to the main outlet, wherein the branching device can safely contain and divide 10-70 Hz, 5-100 psi pulses propagating in a 500-1500 psig natural gas pipe, and wherein the main inlet and the main outlet include a flanged joint for coupling the branching device to the reciprocating compressor system, and wherein the branching outlet and the branching inlet include a flanged joint for coupling the branching device to the external attenuating conduit.

* * * * *